Figure 5:
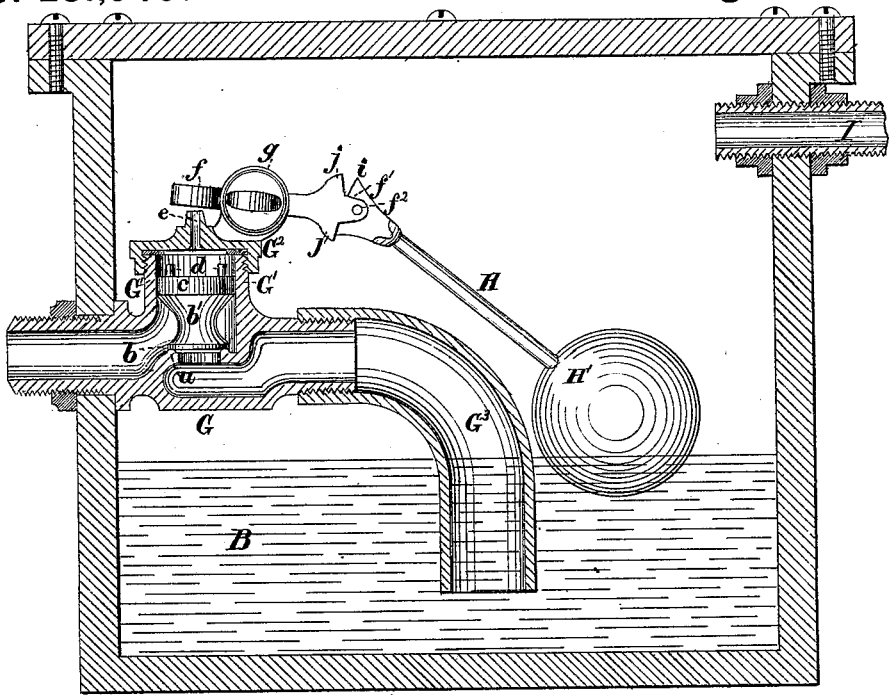

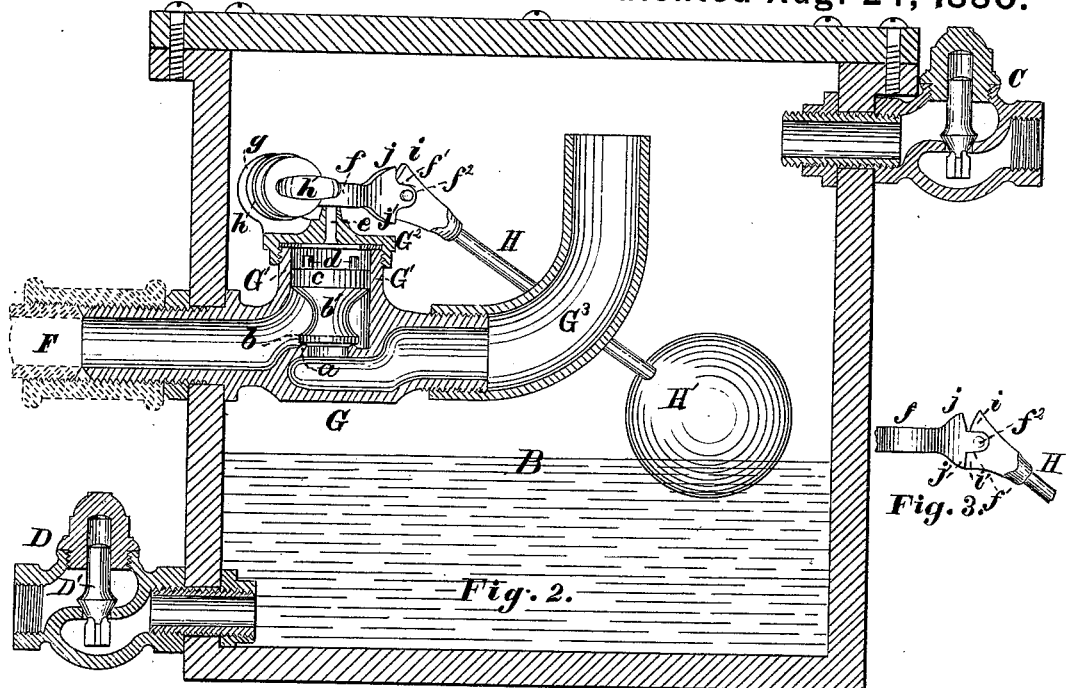

N. CURTIS.
Automatic Boiler Feed.

No. 231,543. Patented Aug. 24, 1880.

Witnesses:
F. G. Wallis.
W. E. Lombard.

Inventor:
Nelson Curtis
by N. C. Lombard
Attorney

UNITED STATES PATENT OFFICE.

NELSON CURTIS, OF NEWTON, MASSACHUSETTS.

AUTOMATIC BOILER-FEED.

SPECIFICATION forming part of Letters Patent No. 231,543, dated August 24, 1880.

Application filed January 28, 1880.

*To all whom it may concern:*

Be it known that I, NELSON CURTIS, of Newton, in the county of Middlesex and State of Massachusetts, have invented a new and useful Automatic Boiler-Feed, of which the following, taken in connection with the accompanying drawings, is a specification.

My invention relates to an apparatus for automatically supplying water to steam-boilers or other vessels under pressure, a modified form of which may be used to advantage as a water-trap, and has for its object the production of an effective and always reliable boiler feed or trap that shall be simple in its construction, not liable to get out of order or become inoperative, and comparatively inexpensive; and it consists in the use, in combination with the water-supply pipe of a steam-boiler or other vessel to be supplied with water under pressure, of a water-tank located above the level of the water in the boiler or other vessel and provided with water inlet and outlet valves, a steam-pipe leading from the interior of said tank and communicating with the steam-chamber of the boiler or other vessel, a piston-valve in said pipe or its connections adapted to be held to its seat by the pressure of steam upon its end opposite to the valve-seat, and to be suddenly opened by the pressure of steam in the other direction when the pressure upon the end opposite the valve-seat is relieved, a small secondary or relief valve mounted upon a pivot and adapted to open or close a vent from the chamber at the end of said piston-valve, opposite its seat, by a movement around said pivot, and a float on the end of an arm, the other end of which is connected by a shouldered stop-joint to said relief-valve in such a manner that said float may rise or fall through a given arc without affecting the valve, and then, by the contact of the shoulders of the joint, cause the valve to open or close.

It further consists in the use, in a boiler-feed apparatus, of a pivoted valve, in combination with a ball or other float attached to one end of an arm or lever, the other end of which is connected by a shouldered stop-joint to said valve in such a manner that said float may rise and fall through a given arc without moving the valve, and then, by contact of one or the other of said shoulders, cause the valve to open or close.

It further consists in the combination of a water-supply tank or reservoir, a pivoted valve adapted to control the inflow of steam to said reservoir, and thereby regulate the discharge of water therefrom, and held to its seat by a frictional device attached to its pivot and adapted to be adjusted to increase or diminish the friction, and a ball or other float connected to said valve by a shouldered stop-joint in such a manner that as the water rises in the tank or reservoir the float will rise without moving the valve till the shoulders of said joint come in contact, when the valve will be raised with the float and permit the admission of steam to equalize the pressure upon the upper and lower side of the water, when the force of gravity will cause the water in the tank to descend into the boiler, the float falling with the water in the tank till the opposite shoulders of the float arm and valve come in contact, when the valve will be closed by being compelled to move with the float-arm, as will be more fully described.

Figure 4:
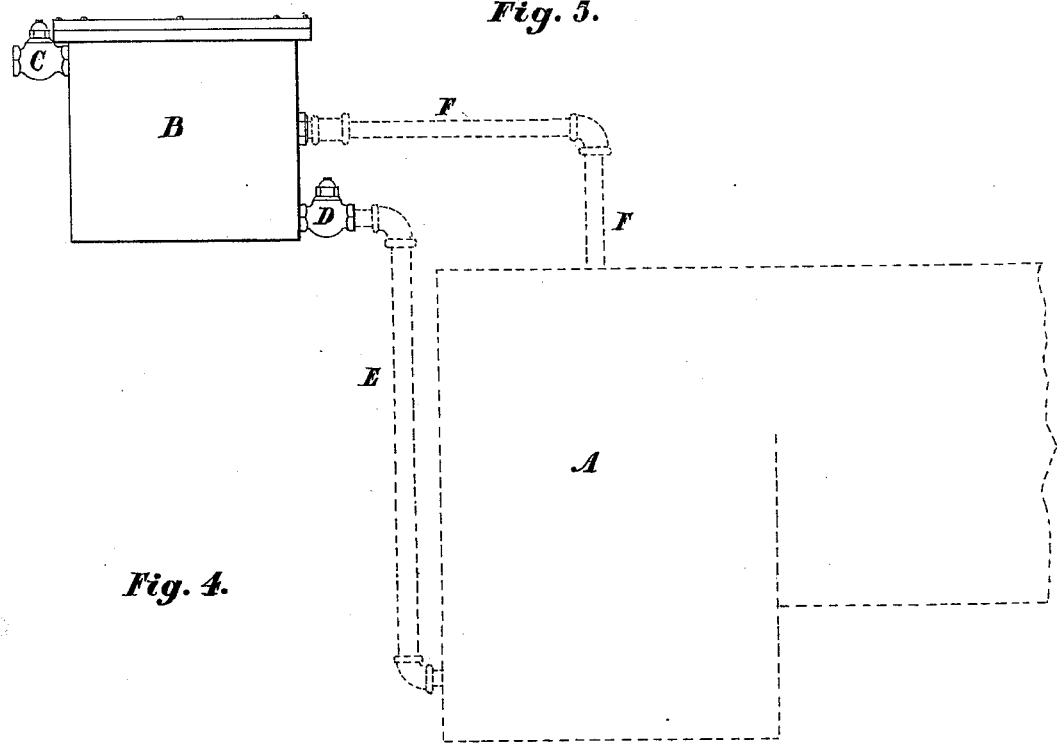

Figure 1 of the accompanying drawings is a plan of my improved boiler-feeding device with a portion of the cover broken away. Fig. 2 is a vertical section on line $x\ x$ on Fig. 1. Fig. 3 is a detail of the stop-joint connecting the float-arm and the relief-valve. Fig. 4 is a diagram illustrating the arrangement of the feeding device relative to the boiler, and Fig. 5 is a vertical section illustrating a modification adapted to be used as a trap.

A represents a boiler to be supplied with water, as that contained therein is made into steam, and B is the water-supply tank or reservoir, to be constructed of such form and material as to be capable of sustaining the same pressure as the boiler, and of sufficient size to receive the steam-valve and a float for operating or controlling said valve, with an arm or lever of suitable length to carry said float and permit a free and easy movement thereof.

The reservoir B has formed in one side, near its top, an orifice, in which is set one end of a check-valve, C, of ordinary construction, arranged to open inward, and to the other or outer end of which may be connected a pipe (not shown) leading therefrom to any suitable water-supply, and the reservoir has also a similar orifice near its bottom, in which is set one end of the valve-casing D, provided with a valve, D', adapted to open outward, and connected at its outer end with the pipe E, (shown in dotted lines in Fig. 4,) which leads to and is connected with the water-leg of the boiler A, (also shown in dotted lines in Fig. 4.)

F is a steam-pipe, one end of which communicates with the steam-chamber of the boiler A and the other end with the interior of the reservoir B, and having connected therewith, in any suitable manner, the valve-casing G, to the inner end of which is connected, in any suitable way, the upwardly-bent pipe $G^3$, the upper open end of which extends upward to within a short distance of the under side of the cover of the reservoir, as shown.

The valve-casing G is provided with a valve-seat, $a$, of ordinary construction, upon which rests the valve $b$, connected by the neck $b'$ to the piston $c$, which is fitted to move freely in the short cylinder G', formed in the upper part of the casing G, its upward movement being limited by the stop-pins $d$ $d$, set in its upper side, which strike against the under side of the cover $G^2$, which is screwed onto the upper end of the cylinder G', as shown.

A small vent-hole, $e$, is made through the cap $G^2$, which is closed by the valve $f$, pivoted to the ear $g$, which projects upward from the cap or cover $G^2$, against which it is pressed with more or less force by the spring-washer $h$, the tension of which may be varied at will by the thumb-screw $h'$.

The opposite end of the valve $f$ is provided with ears $f'$ $f'$, to which is pivoted the float arm or lever H, carrying at its outer or movable end the ball H' or other-shaped float, adapted to rest upon and rise and fall with the water contained in the reservoir B.

The pivoted end of the arm or lever H is provided with two stop-shoulders, $i$ and $i'$, which engage at times with the stop-shoulders $j$ and $j'$, respectively, on the movable end of the valve $f$, said stop-shoulders being arranged at such angles to each other that the float H' may rise and fall through a considerable part of the height of the reservoir before said shoulders come in contact.

The operation of my improved boiler-feed is as follows: The reservoir being arranged above the boiler and connected therewith by suitable water and steam pipes, as shown in Fig. 4, and the reservoir being also connected with a suitable water-supply by means of the check-valve C, water will flow through said valve C into the reservoir B, and as the pressure of steam in the boiler is greater than that of the head of water which supplies the reservoir, and as this pressure of steam is transmitted through the pipe E to the top of the valve D' to hold it on its seat, the water, not being able to escape from the reservoir, begins to rise therein and carries upward the float H', its lever H moving about its pivot $f^2$ till the shoulder $i$ comes in contact with the shoulder $j$ on the pivoted valve $f$, when the lever H and valve $f$ will move as one lever about the pivot $h'$, lifting the valve $f$ from its seat and allowing the steam in the cylinder G' above the piston $c$ to escape into the reservoir B, thus relieving the pressure upon the upper end of the piston $c$, when the pressure of steam upon the lower end of the piston moves said piston upward in the cylinder G', carrying with it the valve $b$, raising it from its seat and permitting the steam in the boiler to rush into the reservoir B above the water, thereby causing a sudden increase of pressure in the upper part of the reservoir equal to that in the boiler, closing the valve C and stopping the inflow of water, when the force of gravity or the weight of the water in the tank B causes the valve D' to be raised and the water in the reservoir will flow into the boiler. As the water falls in the reservoir the float H' also falls, moving about the pivot $f^2$ till the shoulders $i'$ and $j'$ come in contact, when the valve $f$ is moved about its pivot $h'$ till the vent-orifice $e$ is closed, when the steam in the pipe F slowly finds its way past the piston $c$, which is loosely fitted for that purpose into the chamber above it, till the pressure in said chamber is equal to that in the pipe F, and the pressure upon the opposite ends of the piston $c$ and valve $b$ is equal, when the force of gravity will cause the piston $c$ and valve $b$ to descend till the valve $b$ rests upon its seat, thereby stopping the flow of steam into the reservoir. The steam contained in the reservoir very soon becomes condensed, thus creating a partial vacuum in the reservoir, when the valve C will be opened and water will again flow into the reservoir, and the operations will be repeated.

In Fig. 5 is illustrated a modification of my invention adapted to the uses of a trap, in which B is the trap-chamber supplied with the inlet-pipe I, which leads to and communicates with the lower part of a coil or other steam-chamber, from which it is desired to remove the water of condensation.

The valve-casing G, cylinder G', valve $b$, piston $c$, pins $d$ $d$, cap $G^2$, orifice $e$, the float H', arm H and its connections to the valve $f$, and the frictional devices are all constructed and arranged substantially as heretofore described. The valve $f$, however, has its pivotal connection to the cap $G^2$ between its seat and the pivotal connection of the arm H, and as a consequence said valve is opened by the falling of the float H' and closed by the rising of the same, instead of being closed by the fall and opened by the rise, as in the boiler-feed, and the pipe $G^3$ is bent downward instead of upward, as before described.

The upper part of the chamber B, Fig. 5, is filled with steam from the coil or other steam-chamber, and the water of condensation is all deposited in the bottom of said chamber, and until it accumulates in sufficient quantity to raise the float H' to near the top of said chamber the valve $f$ is open, and the steam passing through the orifice $e$ fills the chamber above the piston $c$, and pressing upon said piston forces the valve $b$ upon its seat and retains it in a closed condition, so long as the valve $f$ remains open.

As the water gradually accumulates in the chamber B the float H' rises without affecting the valve $f$ till the shoulders $i$ and $j$ come in contact, when the valve $f$ will be moved about its pivot by the continued upward movement of the float H' till the valve $f$ is closed tightly upon its seat, when the small quantity of steam contained in the cylinder G' above the piston $c$ gradually escapes past the piston into the open air, relieving the pressure upon said piston which has held the valve $b$ upon its seat, and the pressure of steam upon the water in the reservoir B will cause the valve $b$ to be raised from the seat $a$, and the water contained in the chamber B will be discharged therefrom, the float H' falling with the water in said chamber till the shoulders $i'$ and $j'$ come in contact, and the valve $f$ is opened by the continued fall of the float H', when the steam enters the cylinder G' through the orifice $e$ and closes the valve $b$, as before, and the discharge of water is stopped.

What I claim as new, and desire to secure by Letters Patent of the United States, is—

1. The combination of the tank B, provided with water inlet and outlet valves, the steam-inlet valve $b$, connected to and adapted to be operated by the piston $c$, the relief-orifice $e$, pivoted valve $f$, and the float-lever H, connected to said valve by a shouldered stop-joint and carrying at its other end the float H', all arranged and adapted to operate substantially as and for the purposes described.

2. The combination of the pivoted valve $f$ and the float H', attached to one end of the lever or arm H, the other end of which is pivoted to said valve by a shouldered stop-joint, substantially as described.

3. In an automatic feed, a pivoted valve held to its seat by an adjustable frictional device applied to its pivot, and adapted to be intermittently opened and closed by the vibrations of a lever pivoted thereto, and provided with shoulders or stops to limit the extent of the independent movement of said lever and compel the valve to move therewith, all arranged substantially as described.

4. In an automatic feed, a pivoted valve provided with a frictional device applied to its pivot and adapted to hold it on or off its seat with a degree of force that may be varied, in combination with a lever or arm carrying at one end a float and pivoted at its other end to said valve, and provided with shoulders or stops to limit the extent of the independent movement of said arm or lever and compel the valve to move therewith, all arranged substantially as described.

5. In combination with the piston-valve $b$ $c$, a vent or relief passage communicating with the chamber above said piston, a supplementary valve adapted to close said relief-passage, and a float connected to said relief-valve and adapted to rise and fall a given distance without affecting said valve, and then by a continued movement thereof open or close said relief-valve, substantially as described.

6. The combination of the pivoted valve $f$, provided with ears $f'$ $f'$ and shoulders $j$ and $j'$, the spring-washer $h$ and screw pivot-pin $h'$, and the lever or arm H, provided with the shoulders $i$ and $i'$, and pivoted at one end to said valve and carrying at its other end the float H', all arranged and adapted to operate substantially as and for the purposes described.

Executed at Boston, Massachusetts, this 26th day of January, A. D. 1880.

NELSON CURTIS.

Witnesses:
F. G. WALLIS,
W. E. LOMBARD.